(No Model.) 6 Sheets—Sheet 1.
J. H. LUBBERS.
WINDOW GLASS LEER.
No. 492,765. Patented Feb. 28, 1893.
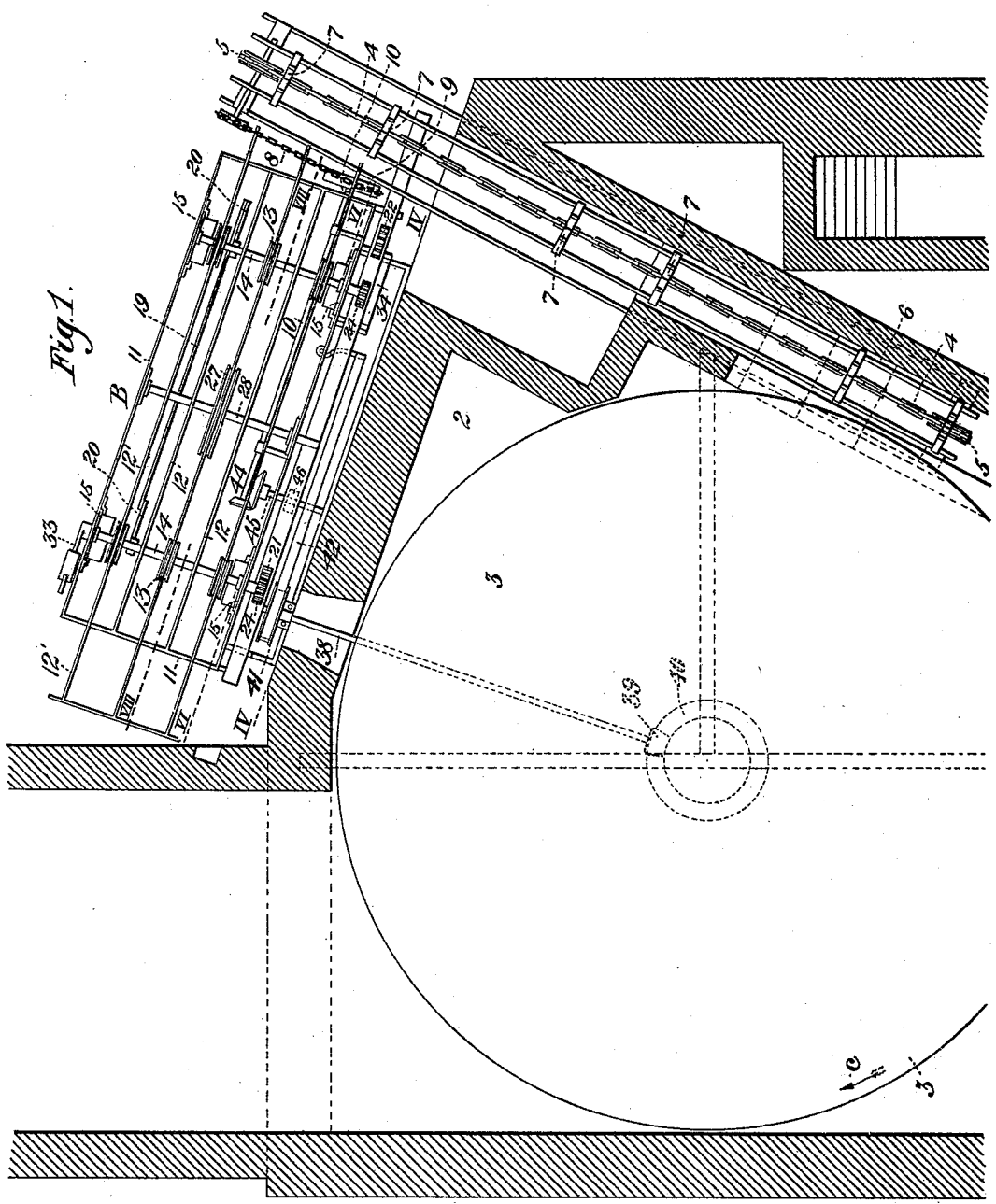
WITNESSES
INVENTOR.

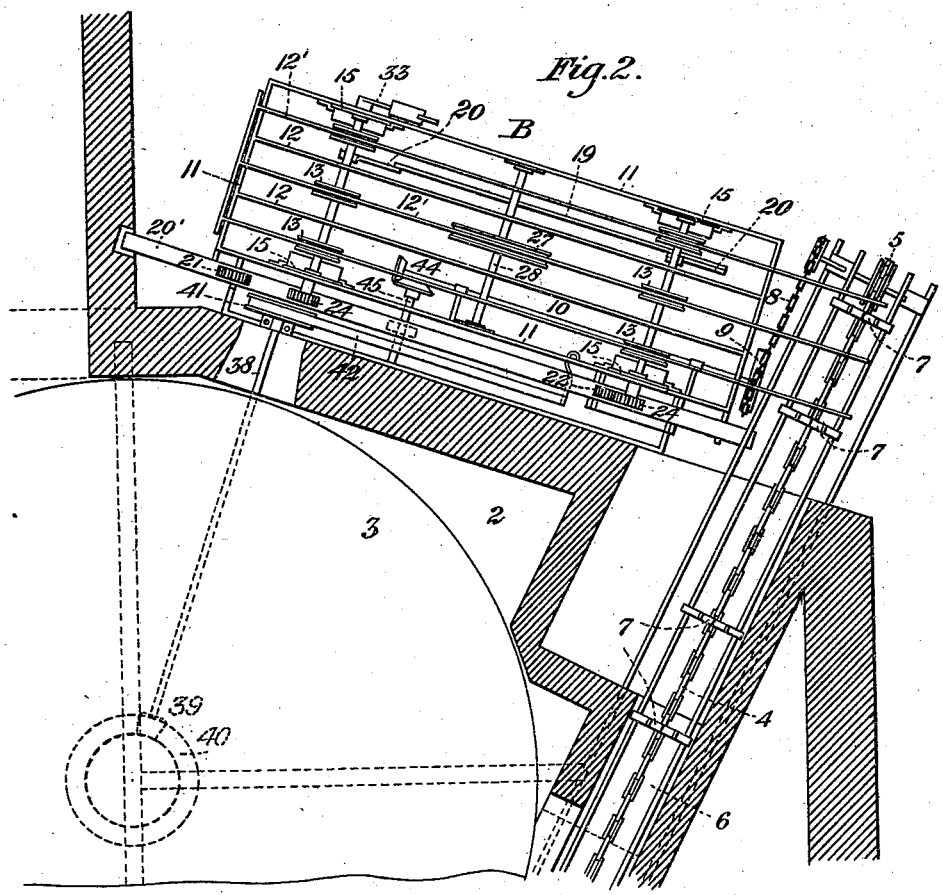

(No Model.) 6 Sheets—Sheet 3.
J. H. LUBBERS.
WINDOW GLASS LEER.
No. 492,765. Patented Feb. 28, 1893.
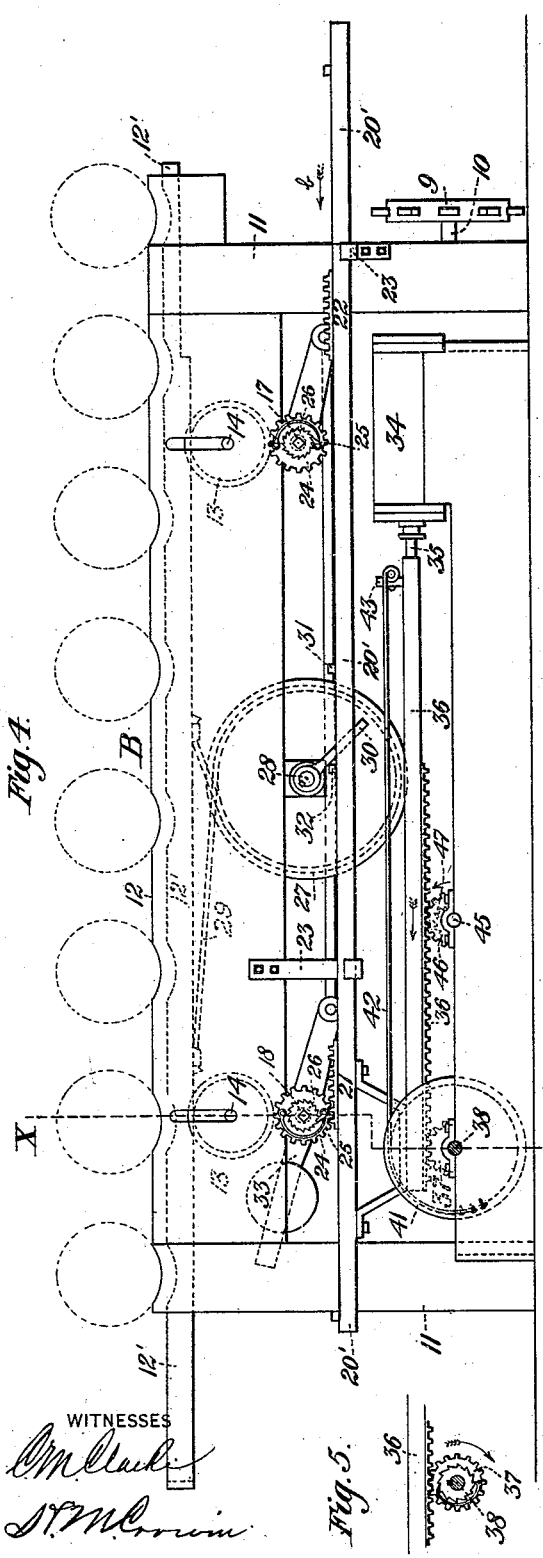
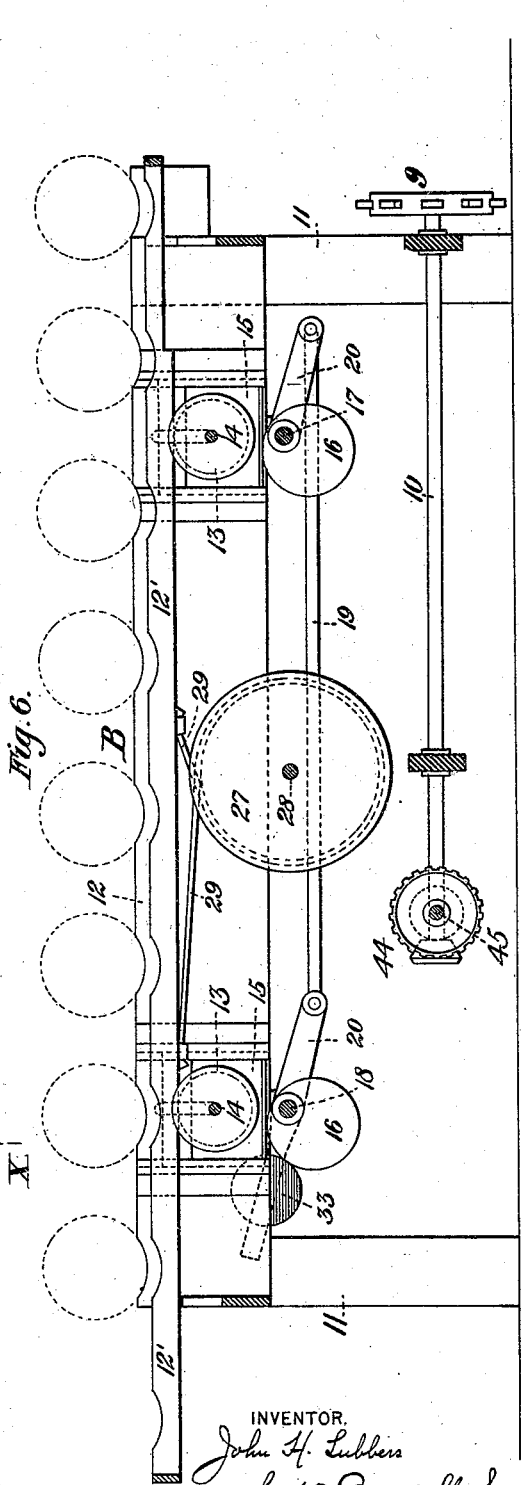
WITNESSES
INVENTOR.
John H. Lubbers
by W. Bakewell & Sons
his Attorneys (No Model.) 6 Sheets—Sheet 4.
J. H. LUBBERS.
WINDOW GLASS LEER.
No. 492,765. Patented Feb. 28, 1893.
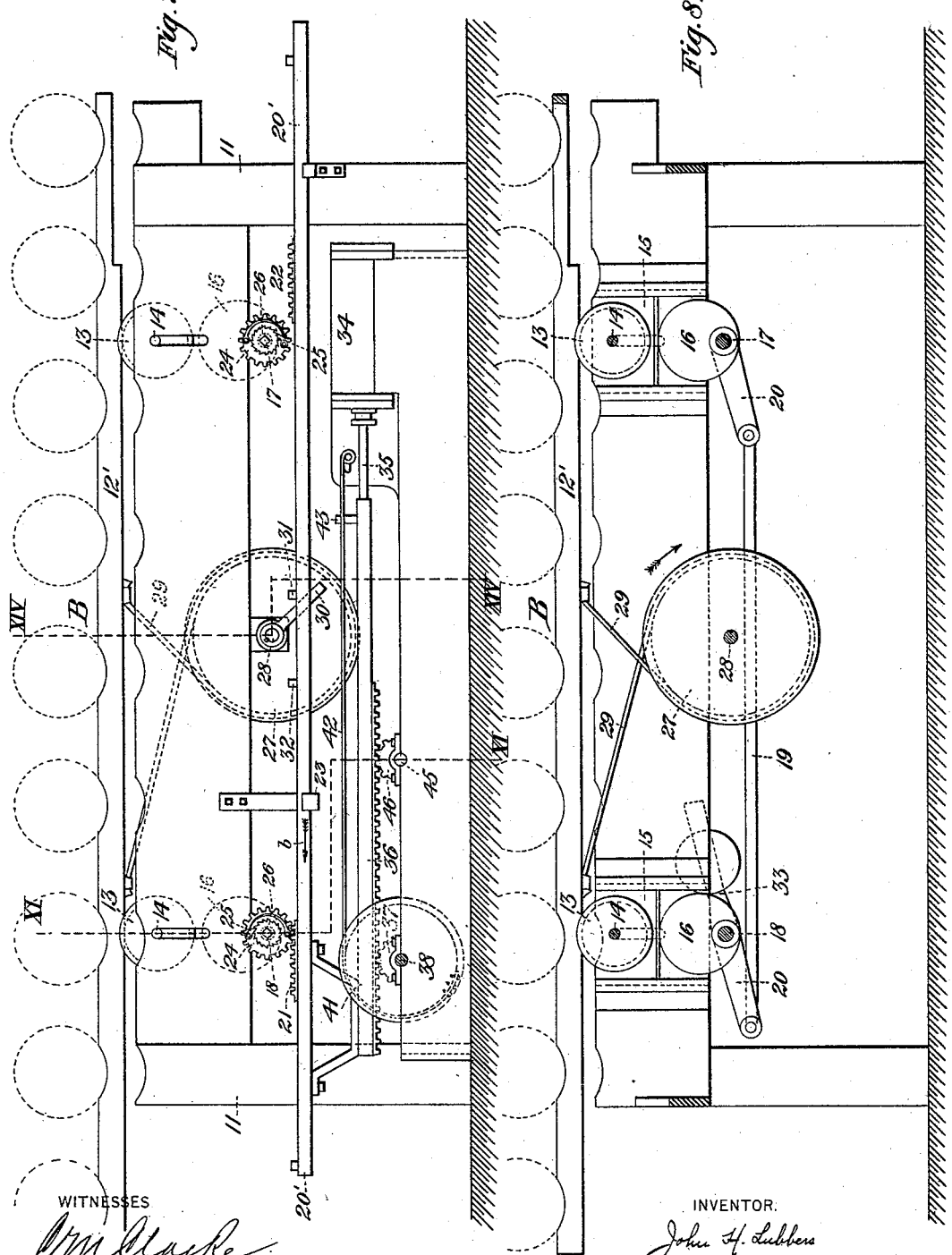
WITNESSES
INVENTOR:
John H. Lubbers
by W. Bakewell & Sons
his Attorneys (No Model.) 6 Sheets—Sheet 5.
J. H. LUBBERS.
WINDOW GLASS LEER.
No. 492,765. Patented Feb. 28, 1893.
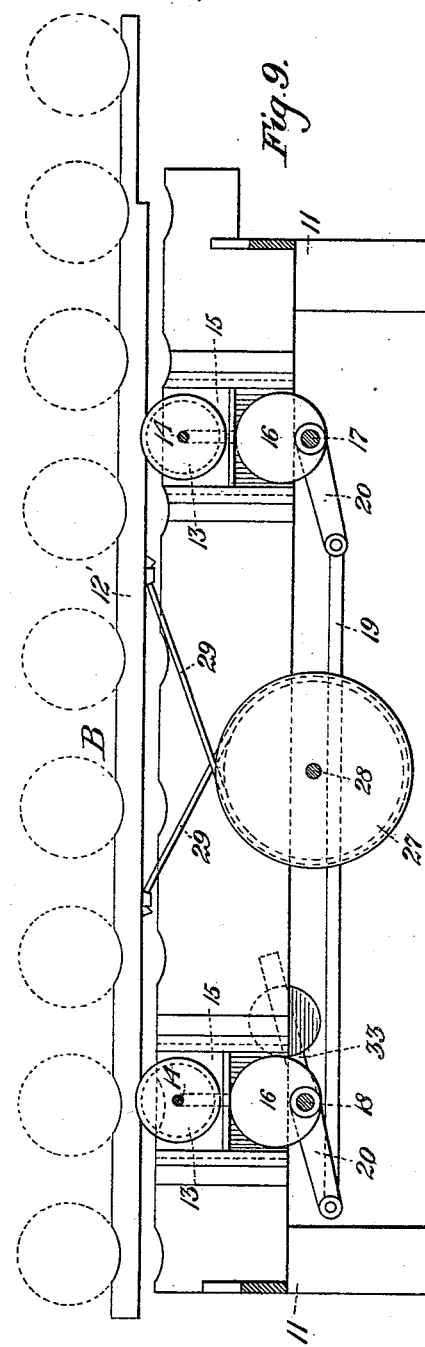
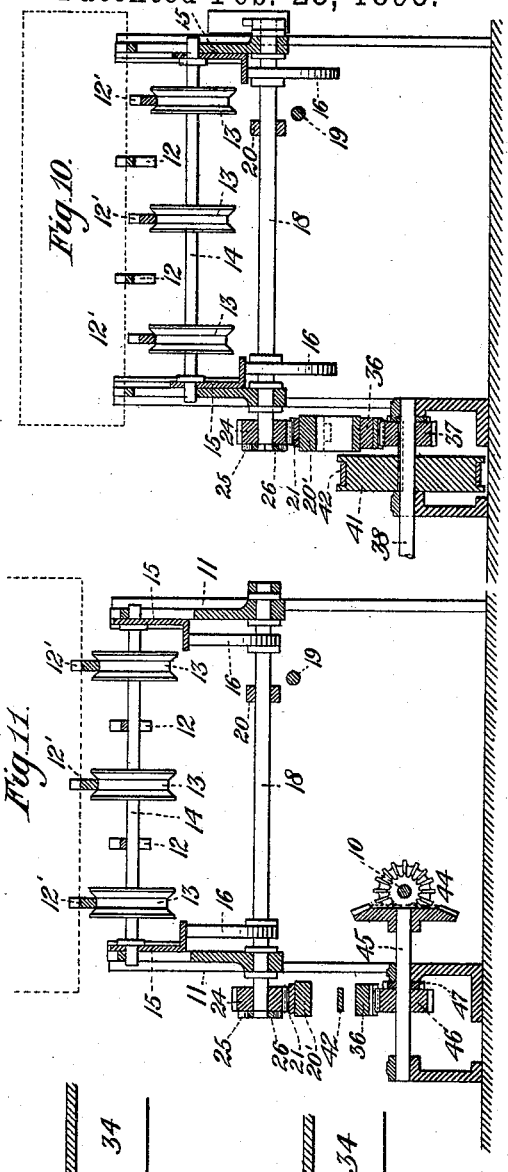
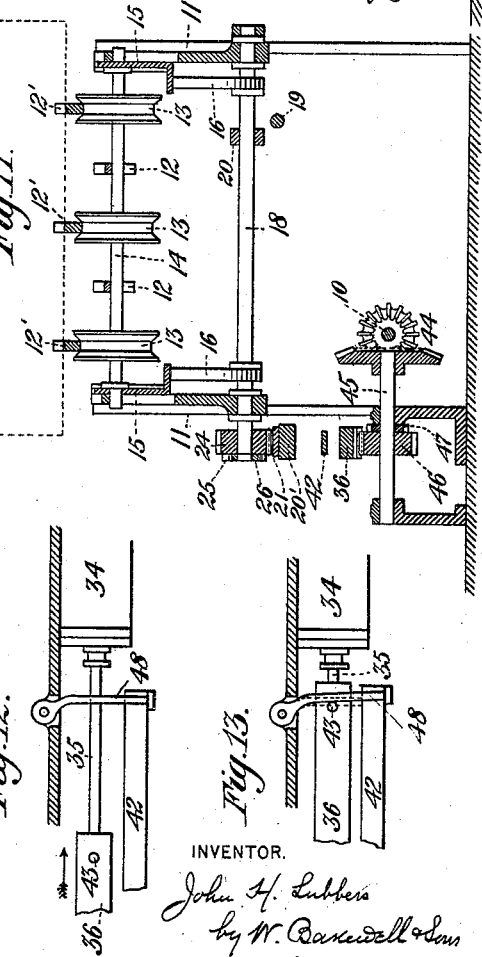
WITNESSES.
INVENTOR.
John H. Lubbers
by W. Bakewell & Sons
his Attorneys.

(No Model.) 6 Sheets—Sheet 6.

J. H. LUBBERS.
WINDOW GLASS LEER.

No. 492,765. Patented Feb. 28, 1893.

WITNESSES
O. M. Clarke
N. M. Corum

INVENTOR.
John H. Lubbers
by W. Bakewell & Sons
his Attorneys

UNITED STATES PATENT OFFICE.

JOHN H. LUBBERS, OF JEANNETTE, PENNSYLVANIA.

WINDOW-GLASS LEER.

SPECIFICATION forming part of Letters Patent No. 492,765, dated February 28, 1893.

Application filed June 5, 1891. Serial No. 395,169. (No model.)

*To all whom it may concern:*

Be it known that I, JOHN H. LUBBERS, of Jeannette, in the county of Westmoreland and State of Pennsylvania, have invented a new and useful Improvement in Window-Glass Leers, of which the following is a full, clear, and exact description, reference being had to the accompanying drawings, forming part of this specification, in which—

Figure 15:
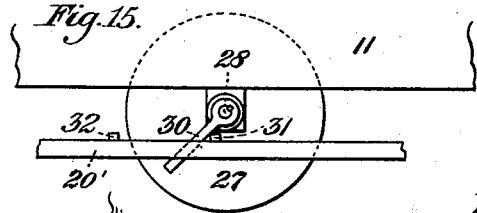
Figure 14:
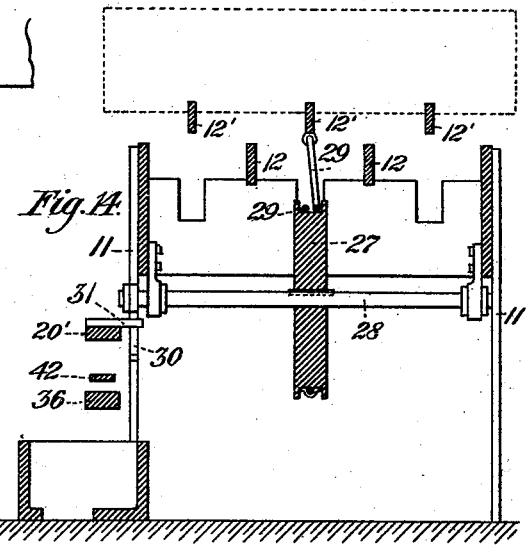
Figure 16:
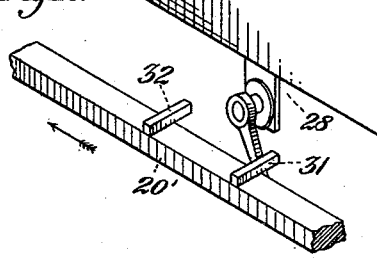
Figure 17:
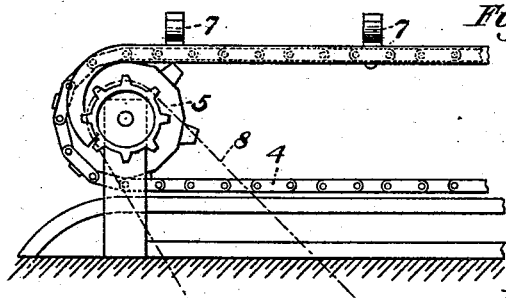
Figure 18:
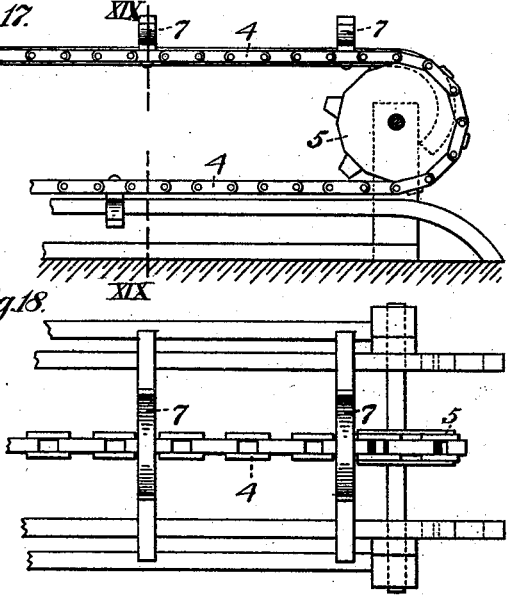
Figure 19:
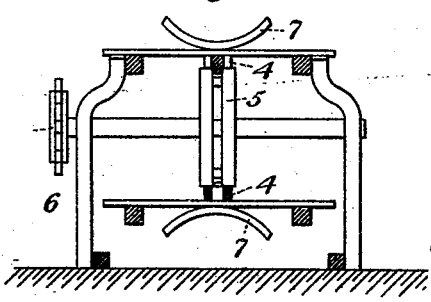

Figure 1 is a sectional plan view showing my improved mechanism for feeding glass to the flattening furnaces. Fig. 2 is a similar view showing the parts in different positions. Fig. 3 is an end elevation of Fig. 2. Fig. 4 is a side elevation of the feed-table shown as if in section on the line IV—IV of Fig. 1. Fig. 5 is a detail view of one of the ratchet gears. Fig. 6 is a vertical longitudinal section on the line VI—VI of Fig. 1. Fig. 7 is a side elevation, showing the parts in positions different from that shown in Fig. 4, the conveying bars being shown elevated in Fig. 7 and lowered in Fig. 4. Fig. 8 is a vertical longitudinal section on the line VIII—VIII of Fig. 1, showing the parts in the position illustrated in Fig. 7. Fig. 9 is a view similar to Fig. 8, showing the bars projected toward the conveying chain in the position shown in Fig. 2. Fig. 10 is a vertical cross-section on the line X—X of Fig. 4. Fig. 11 is an irregular vertical cross-section on the line XI—XI of Fig. 7. Figs. 12 and 13 are detail views, showing the retarding mechanism. Fig. 14 is a vertical cross-section on the line XIV—XIV of Fig. 7. Figs. 15 and 16 are detail views, the first being in side elevation, and the second in perspective. Fig. 17 is a side elevation, partly in section, of the conveying chain. Fig. 18 is a plan view thereof. Fig. 19 is a vertical cross-section on the line XIX—XIX of Fig. 17.

Like symbols of reference indicate like parts in each.

The object of my invention is to provide means by which glass cylinders or rollers may be conveyed to the flattening stone, on which they are opened and flattened into sheet form. The advantage of such device is that it reduces greatly the labor and time required in managing the operation of the flattening oven, and thus serves to cheapen the cost of manufacture of the glass.

To this end my invention consists in the combination with a glass flattening oven of a conveyer adapted to carry the glass cylinders thereto, and also in the combination with such conveyer of a feed table from which the cylinders are delivered thereto in succession.

It also consists in certain other combinations and elements of construction hereinafter described and claimed.

Referring to Figs. 1 and 2 of the drawings, 2 represents the flattening oven, containing a rotary table 3, carrying the usual stones on which the glass cylinders are heated and flattened.

4 is an endless chain arranged on sprocket-wheels 5 in a passage 6 and leading from outside the flattening oven to a position therein at the level of the flattening wheel and in proximity thereto. This chain, as illustrated in detail in Figs. 17 18 and 19 carries yokes or rests 7 adapted to hold the glass cylinders, and one of the sprocket-wheels 5 is driven by a belt or chain 8 from a wheel 9 on a driven shaft 10, which derives its motion in the manner hereinafter explained.

To deliver the glass cylinders to the yokes or rests on the endless chain, I employ a feed-table B constructed and operated as follows:—11 is the frame of the table, which extends on the outside of the flattening oven nearly to and at right angles to the endless chain. Said frame comprises a number of horizontal parallel separated bars 12, which may be fixed at the ends so as to be incapable of longitudinal motion, and alternately between said bars are arranged the horizontal parallel bars 12' of a longitudinally movable grid or frame. These bars 12', which because of their capacity for longitudinal rectilinear motion, I shall call the movable bars, are supported by rollers 13 on cross-shafts 14, which as shown in Figs. 4, 6, 7, 8, 9, 10 and 11, are journaled in bearings 15. These bearings are set in vertical slide-ways in the table frame and are vertically movable to lift or lower the shafts and rollers. To elevate the bearings I may employ cams 16, (Figs. 9, 10 and 11) journaled on shafts 17, 18, and connected by crank-arms 20 and a connecting rod 19. The effect of rotating these cams in one direction is to elevate the bearings and to lift the movable bars above the level of the stationary bars, as shown in Figs. 9 and 11, while their rotation in the other direction will lower the movable bars below the stationary bars, as shown in Figs. 4, 6 and 10. To rotate the shafts 17, 18 and their cams, I employ a longitudinally movable bar 20' supported on bearings 23, and having series of rack-teeth 21, 22. To transmit motion from the rack-teeth to the shafts, I provide the latter with gear-wheels 24, set loosely thereon, and carrying pawls 25 engaging with ratchet-wheels 26 fixed to the shafts. The construction is such that when the bar 20' is moved in the direction of the arrow $b$ (Fig. 4), during part of such motion the teeth 21 will turn the gear-wheel of the shaft 18, which by the pawl and ratchet will rotate the shaft 18 so as to raise the movable bars. The subsequent engagement of the rack teeth 22 with the gear-wheel on the shaft 17 will not rotate said shaft because of the arrangement of the ratchet and pawl, but on the reverse motion of the bar, the shaft 17 will be turned so as to lower the movable bars, while the shaft 18 will not be rotated. To maintain the movable bars in the elevated or lowered position, one of the shafts 17, 18, is provided with a weighted lever 33, which as the shafts are rotated, will swing from one side of the center to the other, as shown in Figs. 4 and 9.

To move the bars longitudinally, I employ a drum or pulley 27 fixed to a cross-shaft 28, and connected with the movable bars by chains or other flexible connections 29. Said shaft and pulley are rotated by a radial arm 30, which projects from the shaft and is adapted to be engaged by projections 31 and 32 on the bar 20', these projections being situate relatively to the rack-teeth 21 and 22, so that after the gear-wheel on the shaft 18 has been rotated by the rack-teeth 21 and the movable bars raised thereby, the projection 31 will engage the radial arm and will turn the pulley 28, thereby through the chain 29 moving the movable bars forward toward the conveying chain. On the reverse motion of the bar 20', after the rack teeth 22 have operated to turn the shaft 17 and to lower the movable bars, the projection 32 will move the arm 30 in the other direction, thereby rotating the pulley 28 and moving the said bars in the reverse direction away from the conveying chain. The bar 20' is moved longitudinally by a power cylinder 34, whose piston rod 35 is fixed to a rack-bar 36, which is connected to the rod 20' as shown, so that the reciprocation of the piston will correspondingly move said rod.

37 is a pinion on a shaft 38 and in gear with the rack 36. Said shaft extends to the axis of the flattening wheel, where it is provided with a pinion 39 in gear with a cog-wheel 40 on said axis. The pinion 37 is connected with the shaft 38 by a ratchet and pawl connection shown in Fig. 5, so that motion of the piston in one direction (its instroke) will rotate the shaft and will turn the flattening wheel in the direction of the arrow $c$ through a definite arc, while motion of the piston on its outstroke will not turn the wheel.

To prevent momentum of the flattening-wheel carrying it too far and jarring the gearing, I provide the shaft 38 with a brake-wheel 41, having an encircling brake-band 42, whose end is secured to a pivoted lever which is secured to a pivoted arm 48 which is engaged by a projection 43 on the piston rod at the end of the instroke of the latter as shown in Figs. 12 and 13. When so engaged the brake-band is drawn taut around the wheel and the rotation of the flattening wheel is checked at once.

The shaft 10 by which the endless chain 8 is driven is connected by gearing 44 with the shaft 45, which is provided with a pinion 46 in gear with the rack 36, and connected with the shaft 45 by a pawl and ratchet connection 47, so that on the outstroke of the piston, the shaft 45 is rotated and the endless chain 8 caused to move a certain distance. On the instroke of the piston, no motion is transmitted to the chain.

The operation of the apparatus is as follows:—Glass cylinders to be delivered to the oven are placed by an attendant on the bars of the table B, as shown by dotted lines in Figs. 4, 5, 6, 7, 8 and 9. The valve controlling the cylinder 34 is within reach of the flattener, who after a sheet of glass has been flattened, operates the valve so as to cause the piston of the cylinder to reciprocate once. The effect of this is, first, to raise the movable bars so as to lift the glass cylinders above the level of the stationary bars (Figs. 7 and 8), and then by the pulley 28, to move the bars forward a certain distance (Fig. 9), and then to lower the movable bars below the level of the stationary bars and to deposit the glass cylinders on the latter. The movable bars and stationary bars are preferably provided with curved recesses adapted to receive the glass cylinders and to prevent them from being displaced on the feed-table. The forward motion of the movable bars carries one of the cylinders directly above a pair of the rests 7 on the chain 4, and when the bars are lowered, the cylinder is deposited in said rest. Then as the movable bars are retracted, by reverse motion of the piston, the conveying chain 4 is simultaneously moved to carry the glass toward the flattening oven, and to bring one of the cylinders previously deposited on the rests of the chain opposite to the opening at which the flattener may transfer it to the stone. At the same time the flattening wheel is turned by the appropriate mechanism before explained. Thus at each operation of the device, a glass cylinder is deposited by the mechanism of the feed-table upon the conveying chain, and is carried by the chain toward the flattening oven, the most advanced cylinder on the conveying chain is delivered at the oven and the flattening wheel is rotated. These motions being under control of one man, it is possible to dispense with much manual labor heretofore required.

It will be understood that the general arrangement and details of construction of the parts of the mechanism may be varied in many ways by the skilled mechanic without departure from the principles of my invention as stated in the broad claims hereof. For example, the specific devices for moving the cylinders on the feed-table, and for conveying them from the feed table to the flattening oven may be changed, but the devices which I have described are of convenience, and I therefore intend in addition to the broad claims to make special claims thereto.

I claim—

1. The combination with a glass-flattening oven, of a conveyer terminating therein and arranged to carry the glass cylinders to the flattening table, a feed-table adjacent to the outer end of the conveyer, and a cooling leer leading from the flattening-oven; substantially as and for the purposes described.

2. The combination with a glass-flattening oven, of an exposed conveyer terminating therein and arranged to carry the glass cylinders to the flattening table, a feed-table adjacent to the outer end of said conveyer and arranged to deliver the cylinders thereto, and a driving motor arranged to actuate both the feed-table and conveyer; substantially as and for the purposes described.

3. The combination with a glass-flattening oven containing a flattening wheel, of an exposed conveyer terminating therein and arranged to carry the glass cylinders to the flattening-wheel, a feed-table adjacent to the outer end of said conveyer and arranged to deliver the cylinders thereto, and a driving-motor arranged to actuate the flattening-wheel, feed-table, and conveyer; substantially as and for the purposes described.

4. The combination with a glass-flattening oven, of an exposed conveyer terminating therein and arranged to carry the glass cylinders to the flattening-table, and a feed-table comprising a support for the glass, and vertically and longitudinally - movable bars arranged to project over the conveyer; substantially as and for the purposes described.

5. In a glass feed-table, the combination with a support for the glass, of a vertically and longitudinally-movable set of bars, gearing for reciprocating the bars vertically, a pulley having a flexible connection by which the bars are moved longitudinally, means for rotating the pulley and a rack-bar arranged to actuate the gearing before the pulley is revolved; substantially as and for the purposes described.

6. In a glass feed-table, the combination with a support for the glass, of a vertically and longitudinally-movable set of bars, cams for moving the bars, vertically pinions connected to the cam-shafts by a pawl and ratchet mechanism, a rack-bar arranged to engage the pinions, and a pulley having flexible connections arranged to move the movable bars longitudinally; substantially as and for the purposes described.

7. In a glass-feed-table, the combination with a support for the glass, of a vertically and longitudinally movable set of bars, having rests thereon, a pulley having a flexible cord connection arranged to move the bars longitudinally, and mechanism arranged to vertically reciprocate the bars; substantially as and for the purposes described.

In testimony whereof I have hereunto set my hand this 1st day of June, A. D. 1891.

JOHN H. LUBBERS.

Witnesses:
MORRIS DAVIS,
ROBT. L. KESTER.